(12) United States Patent
Kim (10) Patent No.: US 8,220,808 B2
(45) Date of Patent: Jul. 17, 2012

(54) REAR SUSPENSION OF VEHICLE

(75) Inventor: Sangil Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 12/836,239

(22) Filed: Jul. 14, 2010

(65) Prior Publication Data

US 2011/0132673 A1 Jun. 9, 2011

(30) Foreign Application Priority Data

Dec. 3, 2009 (KR) .................. 10-2009-0119035

(51) Int. Cl.
*B60G 11/18* (2006.01)
*B60K 1/00* (2006.01)

(52) U.S. Cl. ............ 280/124.107; 280/124.166; 180/62; 180/65.51

(58) Field of Classification Search .............. 180/61, 180/62, 65.51, 65.6; 280/124.107, 124.128, 280/124.166, 124.169, 124.177; 267/273, 267/285

See application file for complete search history.

(56) References Cited

U.S. PATENT DOCUMENTS

| | | | |
|---|---|---|---|
| 5,087,229 A * | 2/1992 | Hewko et al. ............. | 475/149 |
| 5,100,165 A | 3/1992 | Hespelt | |
| 7,334,805 B2 * | 2/2008 | Nam ...................... | 280/86.753 |
| 7,425,006 B2 * | 9/2008 | Worman, Jr. ............. | 280/124.166 |
| 7,556,111 B2 * | 7/2009 | Oshidari ................... | 180/65.51 |
| 7,922,185 B2 * | 4/2011 | Worman, Jr. ............ | 280/124.107 |
| 2006/0180366 A1 * | 8/2006 | Brill et al. ................. | 180/65.6 |
| 2006/0220339 A1 * | 10/2006 | Kusaka et al. ........... | 280/124.166 |
| 2006/0283653 A1 * | 12/2006 | Buschena ................. | 180/340 |
| 2007/0102210 A1 * | 5/2007 | Oshidari ................... | 180/65.5 |
| 2007/0251742 A1 * | 11/2007 | Adams et al. ............. | 180/65.2 |
| 2008/0053725 A1 * | 3/2008 | Kramer .................... | 180/65.5 |
| 2009/0071732 A1 * | 3/2009 | Kim et al. ................. | 180/24.07 |
| 2009/0236157 A1 | 9/2009 | Akamatsu | |
| 2011/0061956 A1 * | 3/2011 | Gilmore et al. ........... | 180/65.51 |

FOREIGN PATENT DOCUMENTS

| | | |
|---|---|---|
| DE | 10359130 A1 * | 7/2005 |
| JP | 10304645 A | 11/1998 |
| JP | 11170831 A | 6/1999 |
| JP | 2000-16040 A | 1/2000 |
| JP | 2007-283987 A | 11/2007 |
| JP | 2008-74135 A | 4/2008 |
| JP | 2008-81090 A | 4/2008 |
| JP | 2008-302789 A | 12/2008 |
| KR | 2001-0032632 A | 4/2001 |
| KR | 10-2006-0017643 A | 2/2006 |
| KR | 20080013491 A | 2/2008 |
| KR | 10-0844091 B1 | 7/2008 |
| KR | 10-2008-0073746 A | 8/2008 |

* cited by examiner

*Primary Examiner* — Joseph Rocca
(74) *Attorney, Agent, or Firm* — Morgan, Lewis & Bockius LLP (57) ABSTRACT

The rear suspension of a vehicle may include trailing arms connected by a torsion beam at both sides thereof, an in-wheel motor case attached to an outer lateral side of the trailing arm, a brake caliper fixed to the in-wheel motor case, a shock absorber having a lower end fixed to the in-wheel motor case, and a hub bearing fixed to an outer lateral side of the in-wheel motor case.

8 Claims, 10 Drawing Sheets

REAR SUSPENSION OF VEHICLE

CROSS-REFERENCE TO RELATED APPLICATIONS

The present application claims priority to Korean Patent Application Number 10-2009-0119035 filed Dec. 3, 2009, the entire contents of which application is incorporated herein for all purposes by this reference.

BACKGROUND OF THE INVENTION

1. Field of the Invention

The present invention relates to a rear suspension of a vehicle, in more detail, a technology associated with the structure of a rear suspension of a vehicle which is equipped with an in-wheel motor, basically including a coupled torsion beam axle structure.

2. Description of Related Art

Because suspensions equipped with a coupled torsion beam axle have a simple structure, the manufacturing cost is inexpensive and relatively high traveling stability can be achieved with small weight, such that they have been used for the rear suspension of vehicles for a long time.

Figure 1:
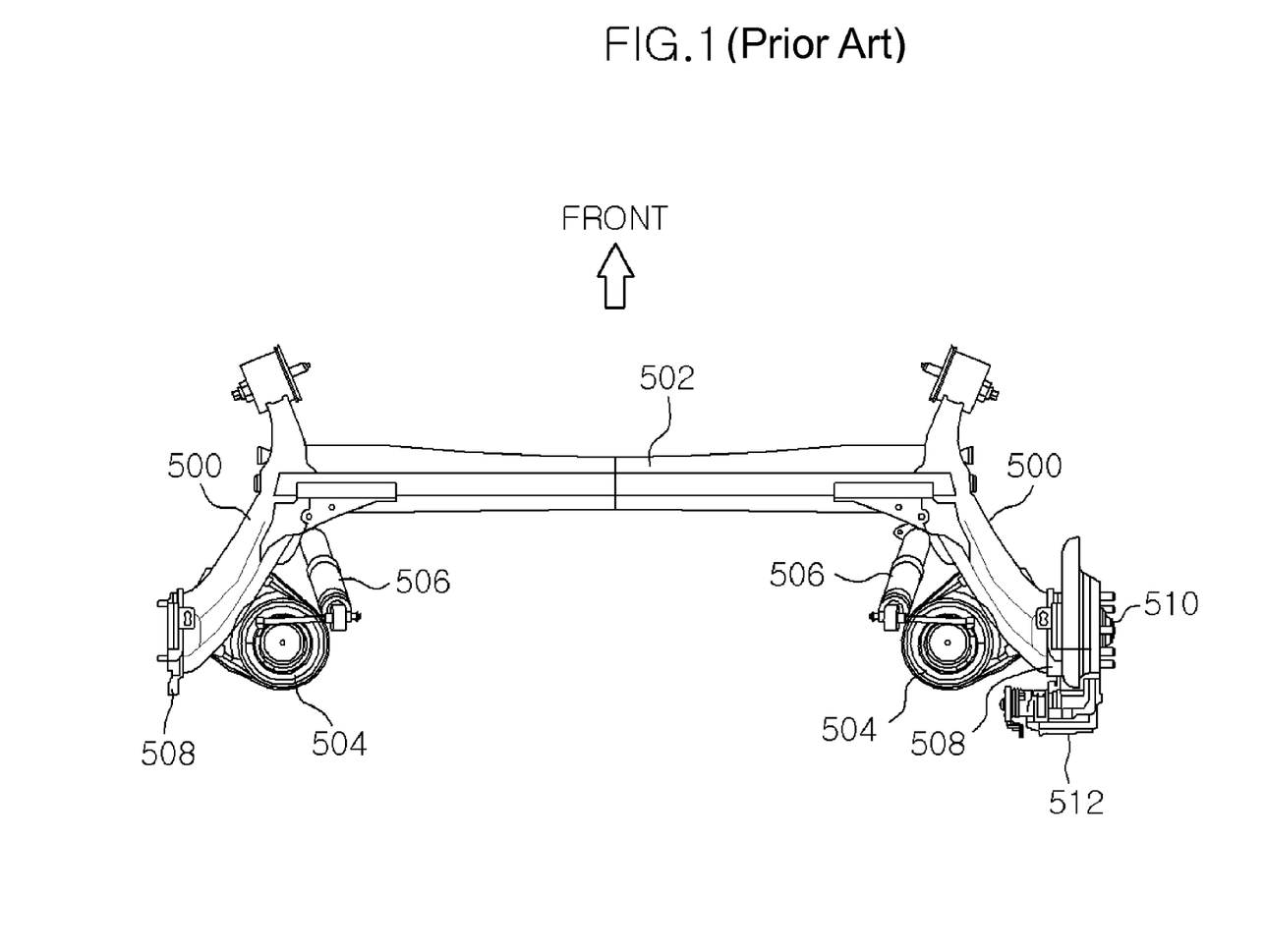
FIG. 1 is a view showing a rear suspension of a vehicle according to the related art, which has a bilateral symmetric structure with some configuration removed at the left.
Figure 2:
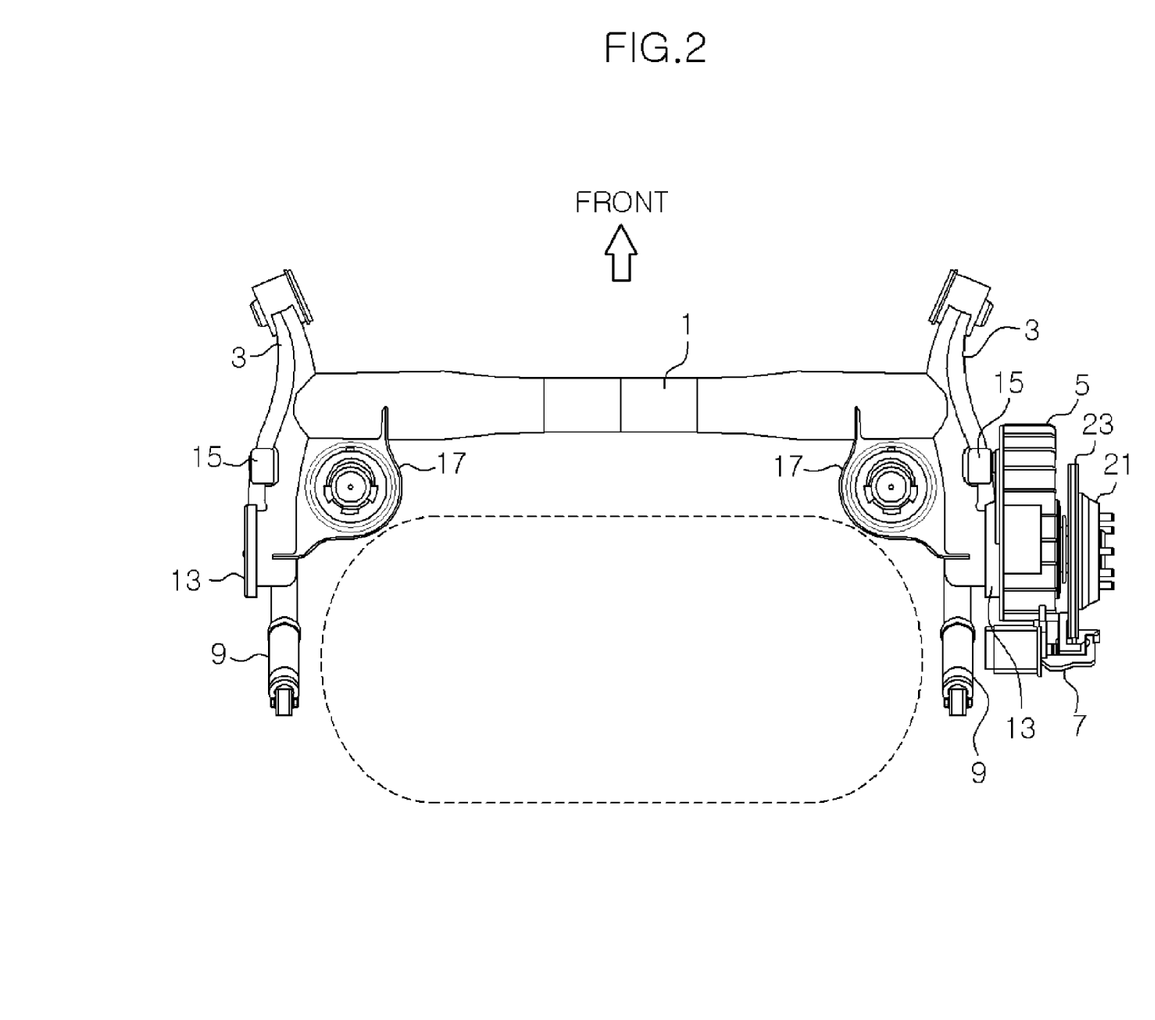
FIG. 2 is a view showing an exemplary rear suspension of a vehicle according to the present invention, which has a bilateral symmetric structure with some configuration removed at the left.
Figure 3:
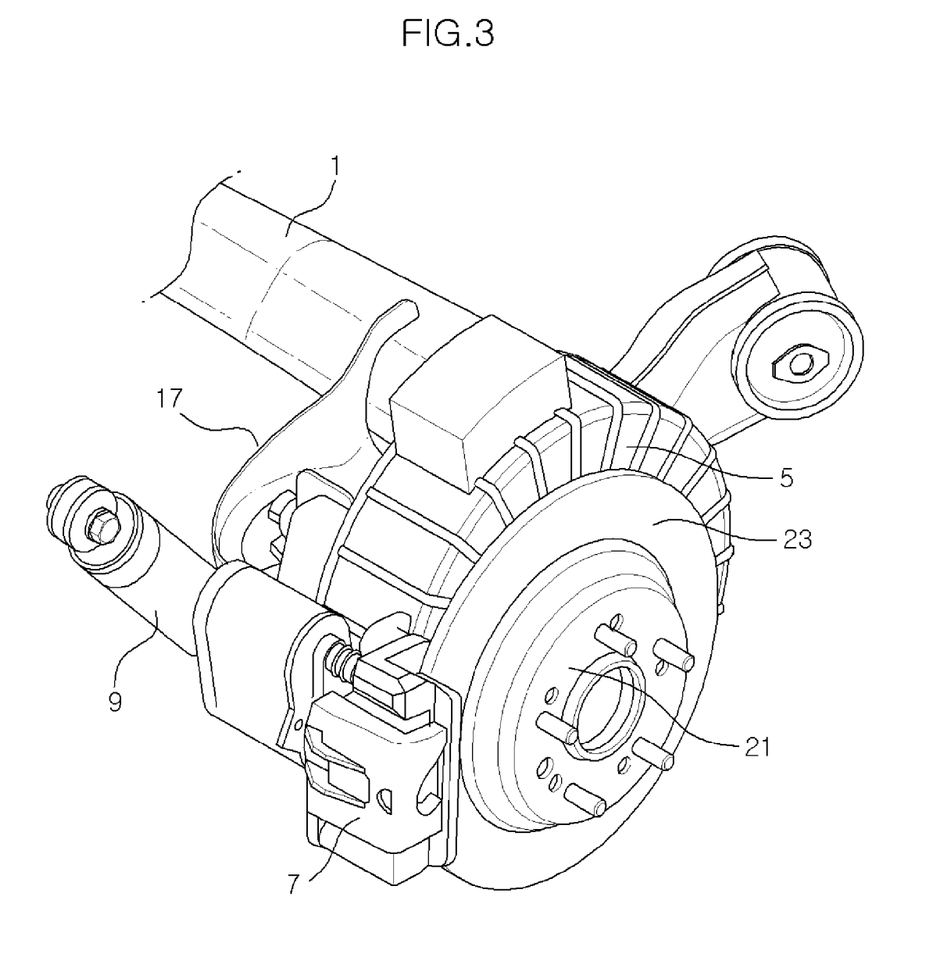
FIGS. 3 and 4 are a perspective view showing a side of the rear suspension shown in FIG. 2.
Figure 4:
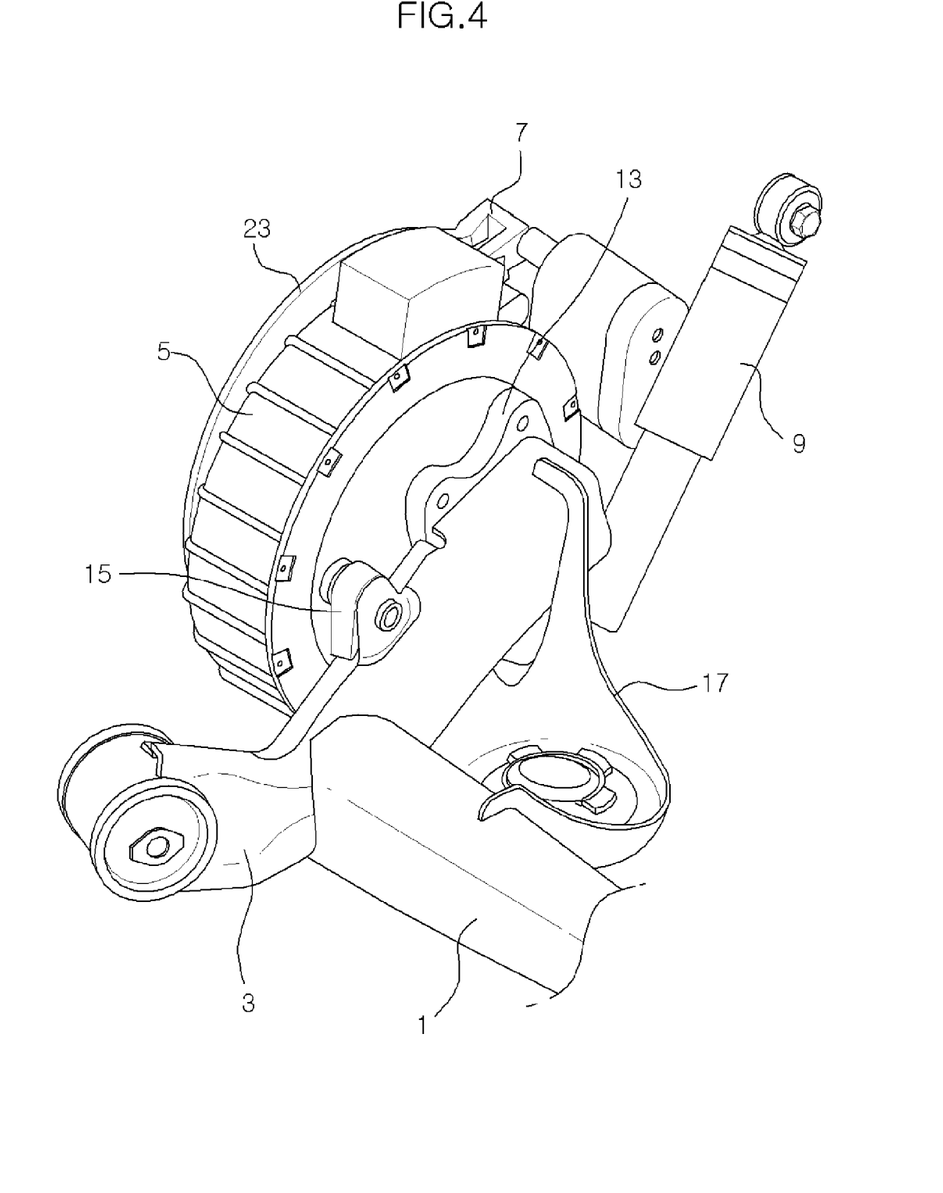
Figure 5:
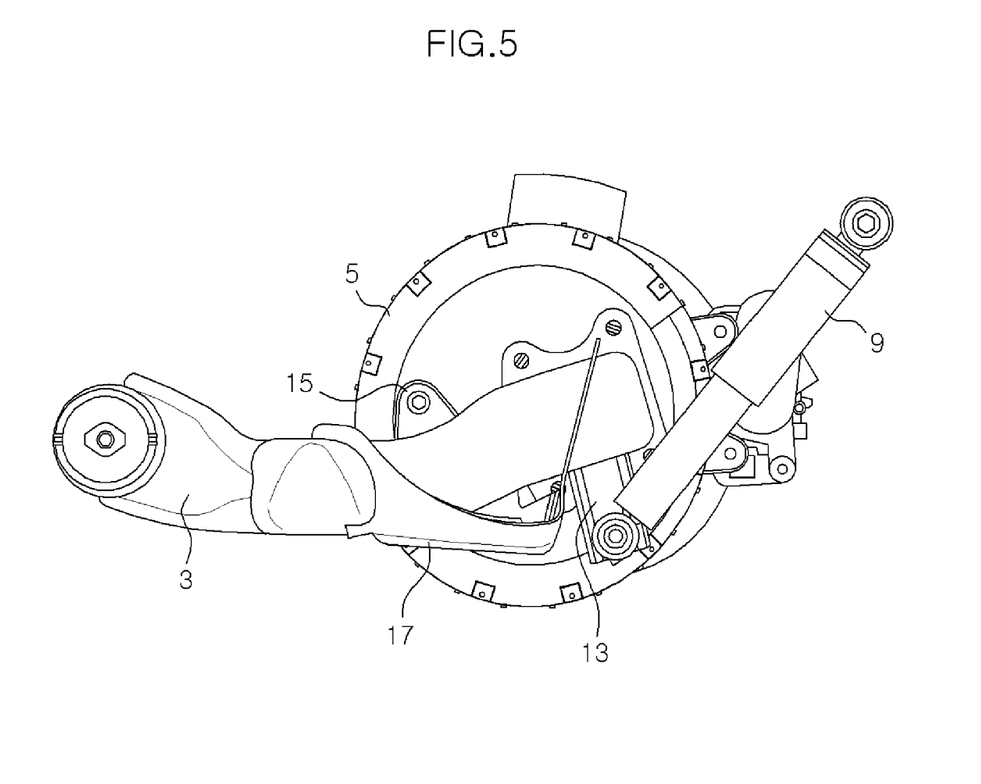
FIGS. 5 and 6 are view seen from the right of FIG. 4.
Figure 6:
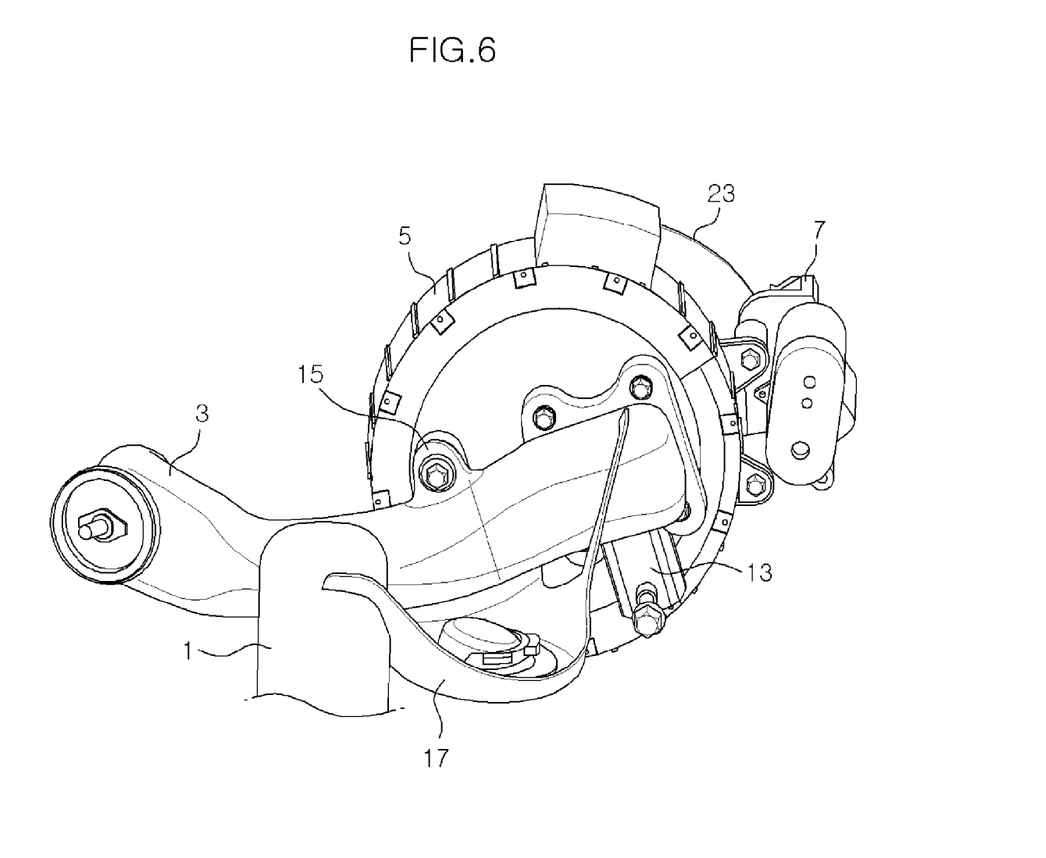
Figure 7:
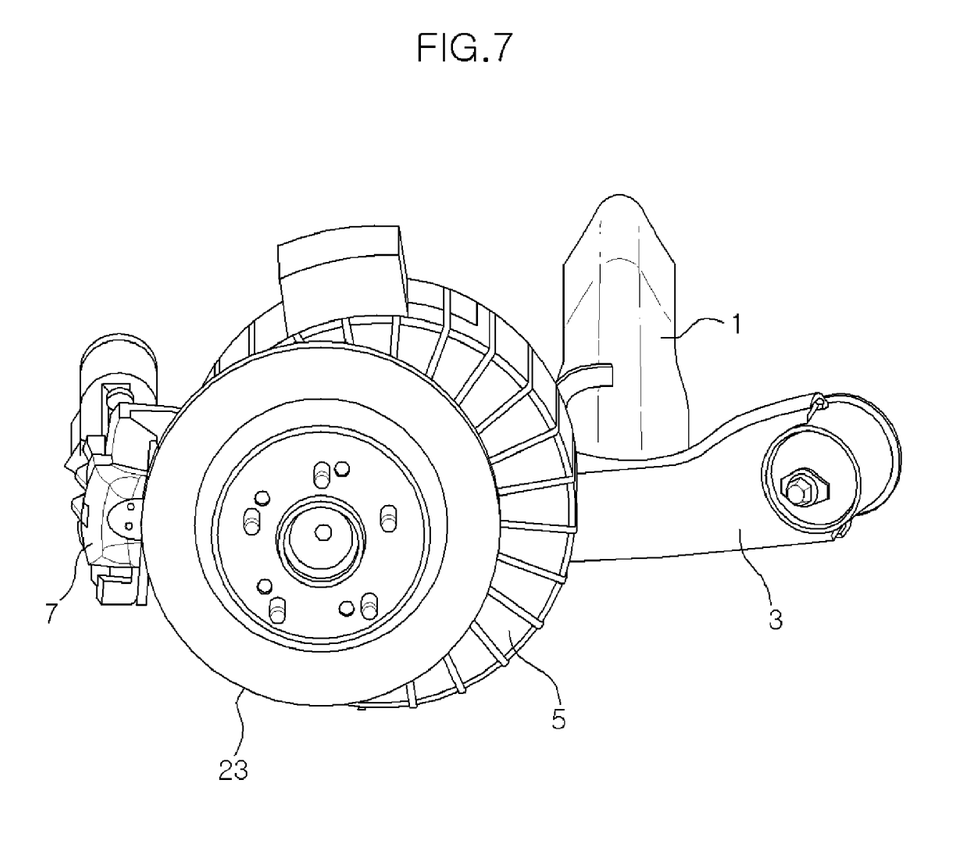
FIG. 7 is a view seen from the opposite side to FIG. 6.
Figure 8:
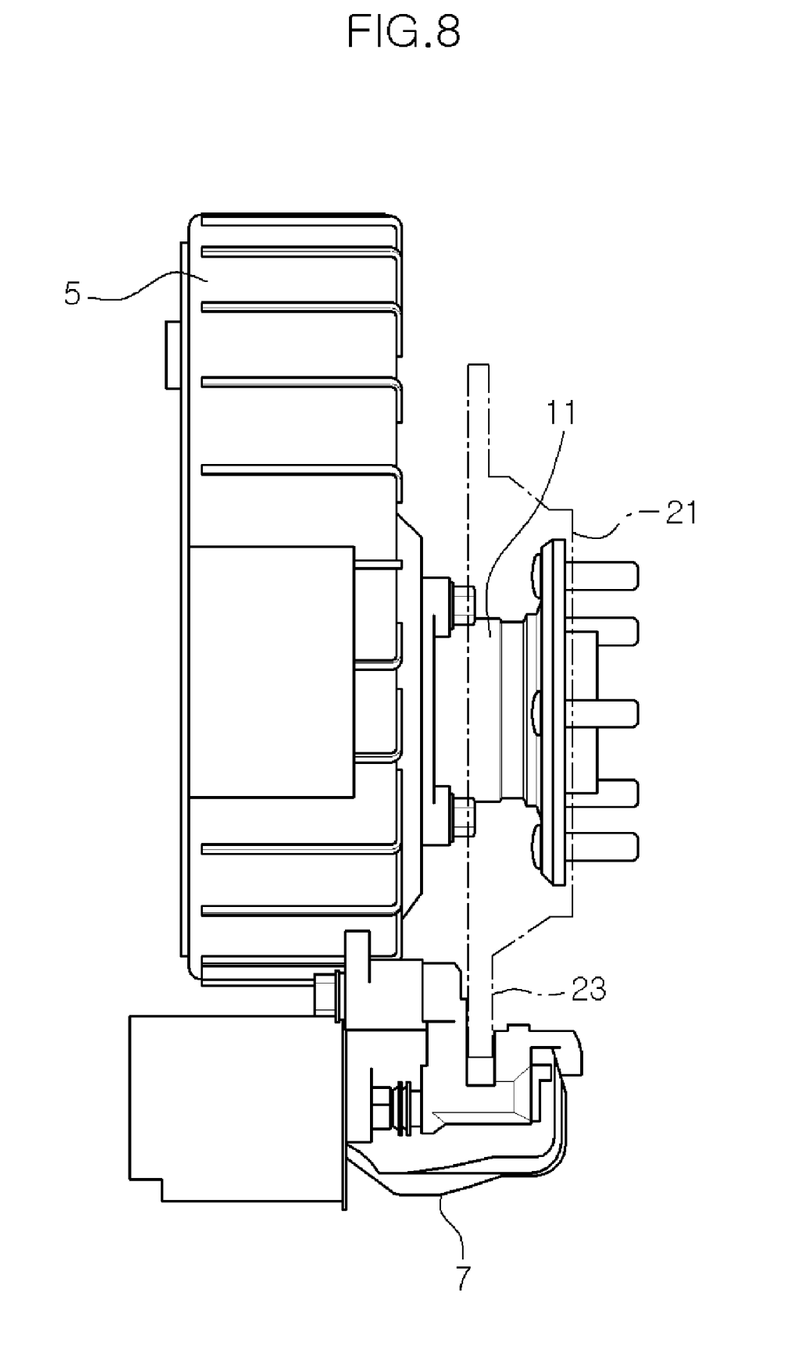
FIG. 8 is a view showing in detail the right side of FIG. 2.

FIG. 1 shows a coupled torsion beam axle of the related art, in which a torsion beam 502 connects both trailing arms 500, torsion beam 502 has a V-shaped cross section opened downward, a spring 504 and a shock absorber 506 are disposed between the torsion beam and the vehicle body, trailing arm 500 is equipped with a spindle bracket 508, and a hub bearing 510 and a brake caliper 512 are mounted by the spindle bracket.

Recently, it is largely required to develop environmental-friendly vehicles, such as a hybrid vehicle, an electric vehicle, and a fuel cell vehicle, to minimize and prevent environmental pollution and those recent new vehicles are usually equipped with an in-wheel motor inside a wheel of the vehicles to increase the driving force and improve fuel efficiency and driving characteristics.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to minimize the weight and the manufacturing cost of a vehicle and simply assemble the vehicle by making it possible to manufacture a rear suspension equipped with an in-wheel motor in a simple structure and a compact configuration while maintaining the basic structure of coupled torsion beam axles of the related art.

In an aspect of the present invention, the rear suspension of a vehicle may include trailing arms connected by a torsion beam at both sides thereof, an in-wheel motor case attached to an outer lateral side of the trailing arm, a brake caliper fixed to the in-wheel motor case, a shock absorber having a lower end fixed to the in-wheel motor case, and a hub bearing fixed to an outer lateral side of the in-wheel motor case.

The shock absorber and the trailing arm may be disposed substantially in the same imaginary vertical plane and the shock absorber is positioned near to a rear side of the trailing arm.

The suspension of the vehicle may further include spring seats fixed to rear-sided corner portions defined by connecting respective distal end portion of the trailing arms with distal end portions of the torsion beam, and a mounting bracket disposed between an outer lateral side of the trailing arm and an inner lateral side of the in-wheel motor case and being connected with the inner lateral side of the in-wheel motor case.

The mounting bracket may be connected with the inner lateral side of the in-wheel motor case at least three points.

At least one connecting flanges may be integrally formed at the trailing arm and directly connected to the in-wheel motor case, wherein the mounting bracket is connected with the in-wheel motor case, in a position offset from the center of the in-wheel motor case with a predetermined distance in a rearward direction of the vehicle, and one of the at least a connecting flange is connected with the in-wheel motor case, in a position offset from the center of the in-wheel motor case with a predetermined distance in a forward direction of the vehicle.

The lower end of the shock absorber may be fixed to the mounting bracket connected to the in-wheel motor case, behind the spring seat.

The hub bearing may be mounted eccentrically on the in-wheel motor case in a rearward direction of the vehicle from the center of the in-wheel motor case, and the brake caliper is fixed to a rear portion of the in-wheel motor case.

At least a connecting rib may be integrally formed at the rear portion of the in-wheel motor case and the brake caliper is mounted thereto, wherein the at least a connecting rib is formed on an outer circumference of the in-wheel motor case.

According to the present invention, hub bearing for mounting a wheel, shock absorber, and a brake caliper are all fixed to in-wheel motor case, such that there is no specific structure for mounting the parts. Therefore, it is possible to reduce the weight of the vehicle with a simple and compact configuration and also reduce the manufacturing cost of the vehicle while improving accuracy of relative positions of the parts in an assembly.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 2 to 10, an exemplary embodiment of the present invention includes trailing arms 3 connected by a torsion beam 1 at both sides, an in-wheel motor case 5 attached to the outer lateral side of trailing arm 3, a brake caliper 7 fixed to in-wheel motor case 5, a shock absorber 9 having the lower end fixed to in-wheel motor case 5, and a hub bearing 11 fixed to the outer lateral side of in-wheel motor case 5.

According to the rear suspension of the present invention, since brake caliper 7, shock absorber 9, and hub bearing 11 are mounted by in-wheel motor case 5 attached to the outer lateral side of trailing arm 3, the peripheral parts are mounted by maximally utilizing in-wheel motor case 5 that is a necessary part, such that it is possible to achieve a compact and relatively light configuration by sharing and minimizing the parts.

Mounting bracket 13 is disposed between in-wheel motor case 5 and trailing arm 3 and is connected with at least three points of the inner lateral side of in-wheel motor case 5. For reference, in the present embodiment, mounting bracket 13 is fastened to the inner lateral side of in-wheel motor case 5 at five points by bolts.

Trailing arm 3 has at least one or more connecting flanges 15 directly connected to in-wheel motor case 5, such that connecting flanges 15 are fastened to in-wheel motor case 5 by bolts.

Mounting bracket 13 is connected with in-wheel motor case 5, at a little rear side of the vehicle from the center of in-wheel motor case 5, and connecting flange 15 is connected with in-wheel motor case 5, at a little front side of the vehicle from the center of in-wheel motor case 5, such that in-wheel motor case 5 is uniformly connected with trailing arm 3 throughout the inner lateral side in a firm and stable position.

Figure 9:
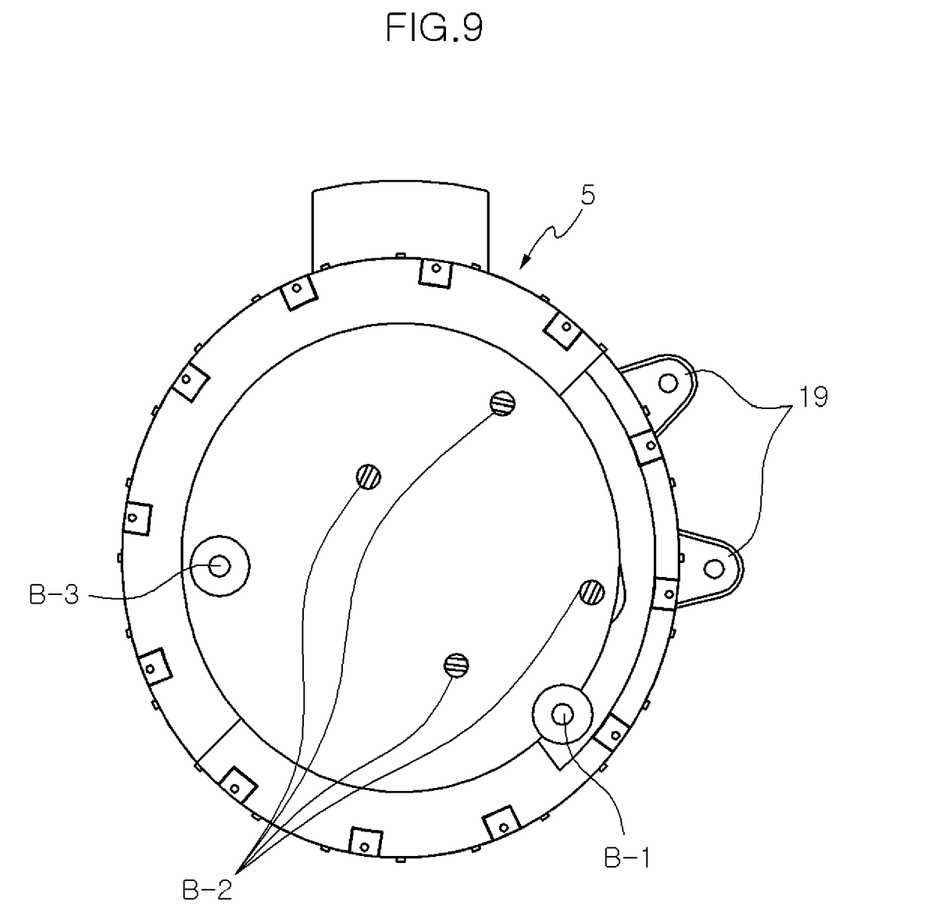
FIG. 9 is a view showing the inner lateral side of an in-wheel motor case.

For reference, referring to FIG. 9 showing the inner lateral side of in-wheel motor case 5, the in-wheel motor case has one bolt hole B-1 for fastening the lower end of shock absorber 9 through mounting bracket 13, four bolt holes B-2 for fastening only mounting bracket 13, and one bolt hole B-3 for fastening connecting bracket 15 of trailing arm 3.

A spring seat 17 is disposed at the rear-sided corner defined by connecting trailing arm 3 with torsion beam 1 to mount a spring between spring seat 17 and the vehicle body.

The lower end of shock absorber 9 is fixed to in-wheel motor case 5 through mounting bracket 13, behind spring seat 17.

As a result, spring seats 17 are disposed at both side behind torsion beam 1 in the rear direction of the vehicle and then shock absorbers 9 are disposed, such that the central space gradually increases toward the rear. Accordingly, it is possible to a large hydrogen tank or other fuel tanks without interfering with other parts, using the space, as indicated by a dotted line in FIG. 2.

Hub bearing 11 is mounted eccentrically toward the rear of the vehicle from the center of in-wheel motor case 5 and brake caliper 7 is fixed to the rear portion of in-wheel motor case 5.

Connecting ribs 19 providing connecting surfaces for mounting brake caliper 7 are integrally formed at the rear portion of in-wheel motor case 5.

A hub 21 is connected to hub bearing 11 and has an integral brake disc 23, such that a portion of brake disc 23 is fitted in brake caliper 7.

Figure 10:
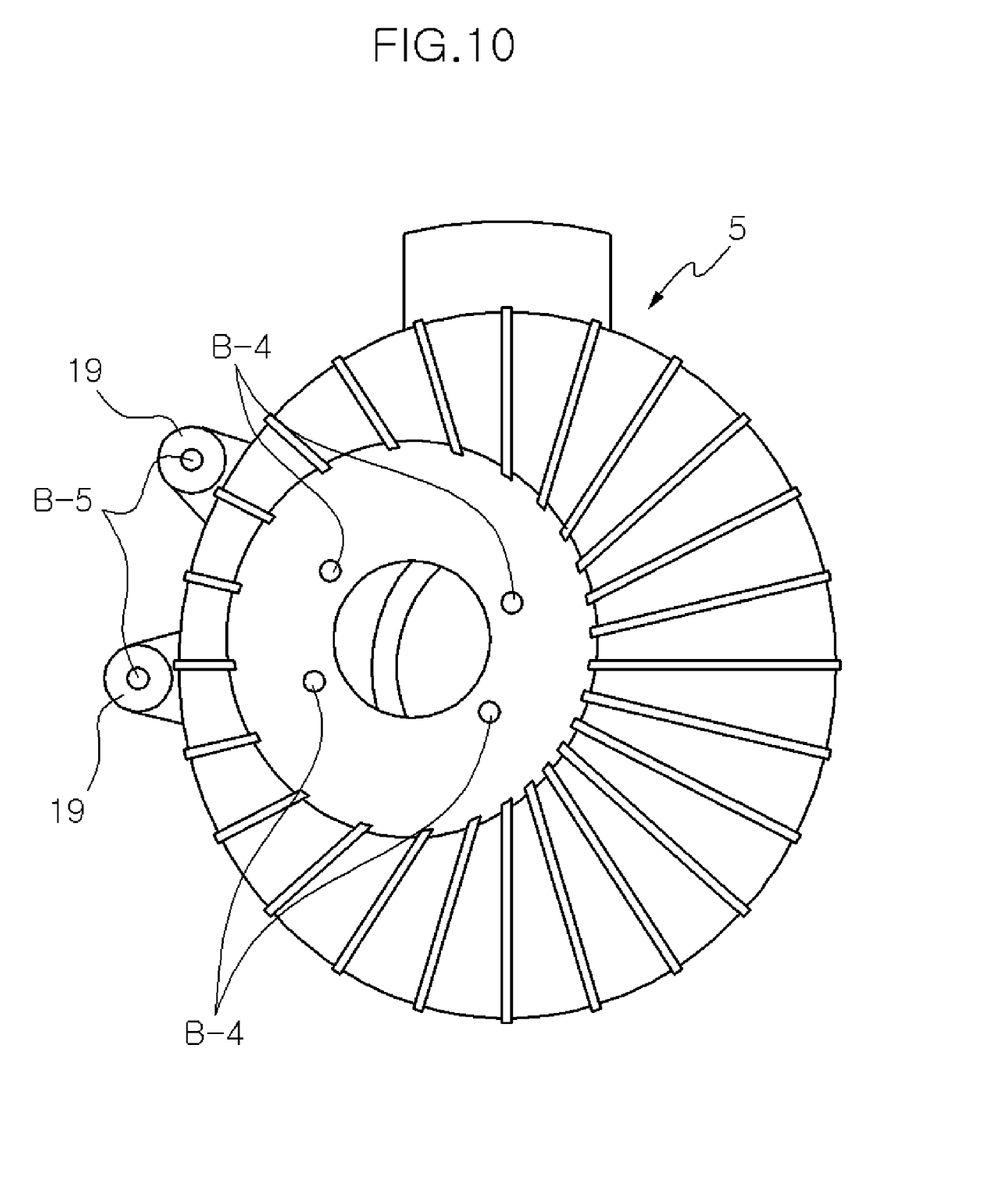
FIG. 10 is a view showing the outer lateral side of the in-wheel motor case.

For reference, in FIG. 10 showing the outer lateral side of in-wheel motor case 5, four bolt holes B-4 for fixing hub bearing 11 is formed, two connecting ribs 19 for fixing brake caliper 7 protrude from the left side, and bolt holes B-5 are also formed through connecting ribs 19.

In the rear suspension of a vehicle having the above configuration according to an exemplary embodiment of the present invention, hub bearing 11 for mounting a wheel, shock absorber 9, and a brake caliper 7 are all fixed to in-wheel motor case 5, such that there is no specific structure for mounting the parts. Therefore, it is possible to reduce the weight of the vehicle with a simple and compact configuration and also reduce the manufacturing cost of the vehicle while improving accuracy of relative positions of the parts in an assembly.

For convenience in explanation and accurate definition in the appended claims, the terms "upper", "lower," "inner," and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear suspension of a vehicle, comprising:
   a plurality of trailing arms connected by a torsion beam at both sides thereof;
   an in-wheel motor case attached to an outer lateral side of at least one of the trailing arms;
   a brake caliper fixed to the in-wheel motor case;
   a shock absorber having a lower end fixed to the in-wheel motor case;
   a hub bearing fixed to an outer lateral side of the in-wheel motor case;
   spring seats fixed to rear-sided corner portions defined by connecting respective distal end portions of the plurality of the trailing arms with distal end portions of the torsion beam; and a mounting bracket disposed between an outer lateral side of the at least one of the trailing arms and an inner lateral side of the in-wheel motor case and being connected with the inner lateral side of the in-wheel motor case;

wherein the mounting bracket is connected with the inner lateral side of the in-wheel motor case at at least three points.

2. The rear suspension of the vehicle as defined in claim 1, wherein the shock absorber and the at least one of the trailing arms are disposed substantially in the same imaginary vertical plane and the shock absorber is positioned near to a rear side of the at least one of the trailing arms.

3. The rear suspension of the vehicle as defined in claim 1, wherein at least one connecting flanges is integrally formed at the at least one of the trailing arms and directly connected to the in-wheel motor case.

4. The rear suspension of the vehicle as defined in claim 3, wherein the mounting bracket is connected with the in-wheel motor case, in a position offset from the center of the in-wheel motor case with a predetermined distance in a rearward direction of the vehicle, and one of the at least a connecting flange is connected with the in-wheel motor case, in a position offset from the center of the in-wheel motor case with a predetermined distance in a forward direction of the vehicle.

5. The rear suspension of the vehicle as defined in claim 1, wherein the lower end of the shock absorber is fixed to the mounting bracket connected to the in-wheel motor case, behind the spring seat.

6. The rear suspension of the vehicle as defined in claim 1, wherein the hub bearing is mounted eccentrically on the in-wheel motor case in a rearward direction of the vehicle from the center of the in-wheel motor case, and the brake caliper is fixed to a rear portion of the in-wheel motor case.

7. The rear suspension of the vehicle as defined in claim 6, wherein at least a connecting rib is integrally formed at the rear portion of the in-wheel motor case and the brake caliper is mounted thereto.

8. The rear suspension of the vehicle as defined in claim 7, wherein the at least a connecting rib is formed on an outer circumference of the in-wheel motor case.

* * * * *